United States Patent [19]

John

[11] 4,245,808
[45] Jan. 20, 1981

[54] COMPACT INTERLOCKING JACK STAND

[75] Inventor: Julius F. John, Gardena, Calif.

[73] Assignee: Norco Industries, Inc., Gardena, Calif.

[21] Appl. No.: 40,511

[22] Filed: May 21, 1979

[51] Int. Cl.³ .............................................. E04G 25/00
[52] U.S. Cl. .................................... 248/352; 248/165; 248/174
[58] Field of Search ............. 248/529, 352, 357, 354 S, 248/405, 351, 174, 165, 188; 254/DIG. 1, 45, 11; 52/23, 126

[56] References Cited

U.S. PATENT DOCUMENTS

| 826,162 | 7/1906 | Hedges et al. | 248/165 X |
| 958,644 | 5/1910 | Huff | 248/523 |
| 1,472,688 | 10/1923 | Sevigny | 248/352 |
| 1,788,133 | 1/1931 | Travers | 248/188.7 |
| 3,232,584 | 2/1966 | Miles | 248/352 X |
| 3,313,505 | 4/1967 | Petrie | 248/405 X |
| 3,314,655 | 4/1967 | Steele | 254/45 X |
| 3,415,490 | 12/1968 | Steele | 254/45 |
| 3,493,209 | 2/1970 | Brammer | 248/352 |
| 4,021,012 | 5/1977 | Miller | 248/352 |
| 4,042,202 | 8/1977 | Molinari | 248/352 |

FOREIGN PATENT DOCUMENTS 1399376 7/1975 United Kingdom ................. 248/188.7

Primary Examiner—J. Franklin Foss

[57] ABSTRACT

An interlocking jack stand has right and left sides of complementary configuration, each supplying two legs of a four-legged stand. Each side is of a sheet material with a semi-circular corner portion merging with legs in right angular relationship and tapered in breadth so as to be wide at the bottom and narrow at the top. The material of one side has slots extending up from the bottom and material of the other side has slots extending down from the top. Slots are respectively at the junction of the semi-circular corner with the legs for one side and part way around the semi-circular corner of the other side so that when the sides are slid together in interlocked relation there is a circular hollow central column partially of double wall thickness in which a vertically adjustable screw support is mounted.

5 Claims, 5 Drawing Figures

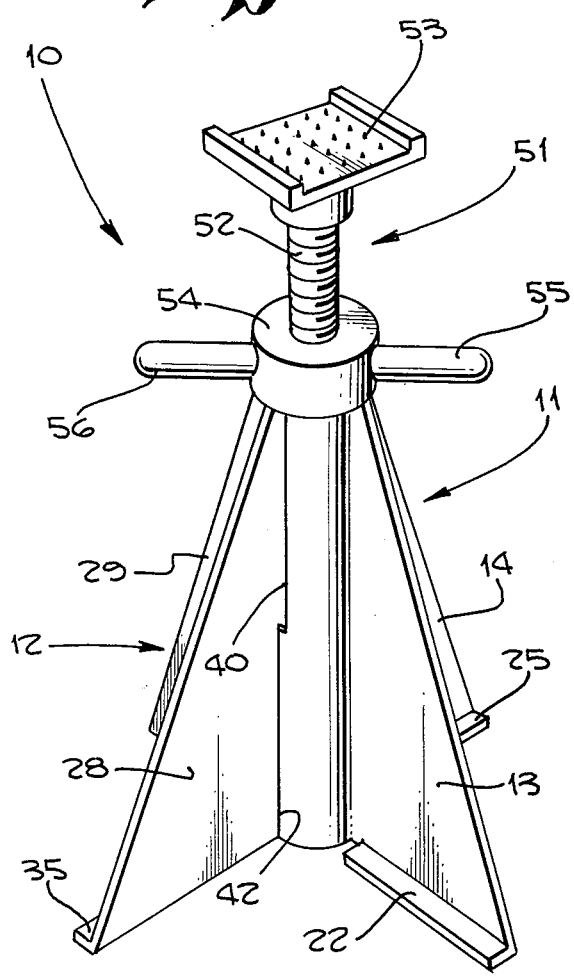
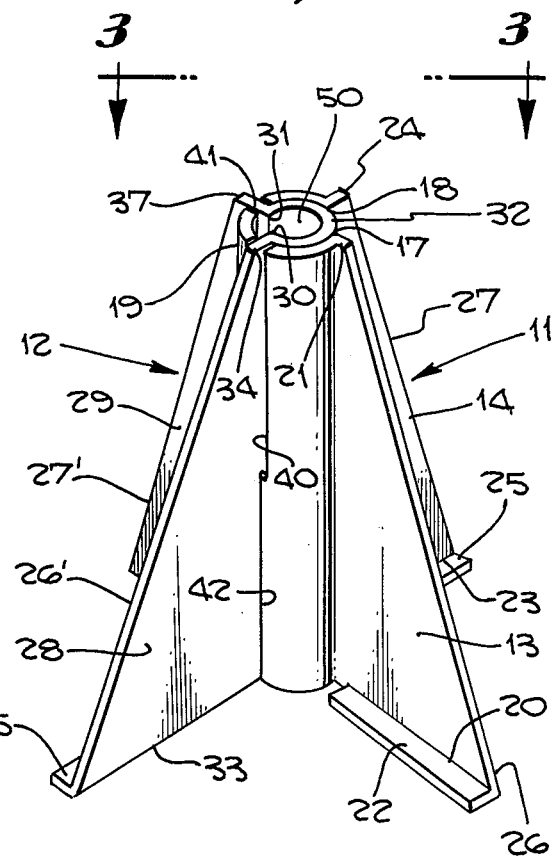
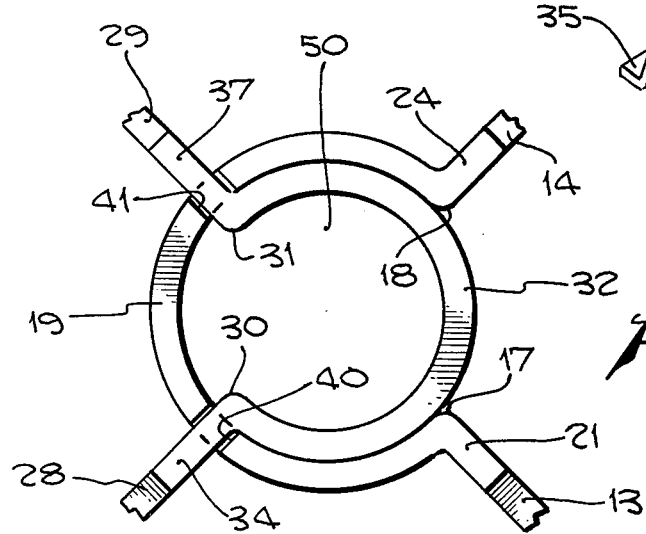

U.S. Patent   Jan. 20, 1981   Sheet 2 of 2   4,245,808
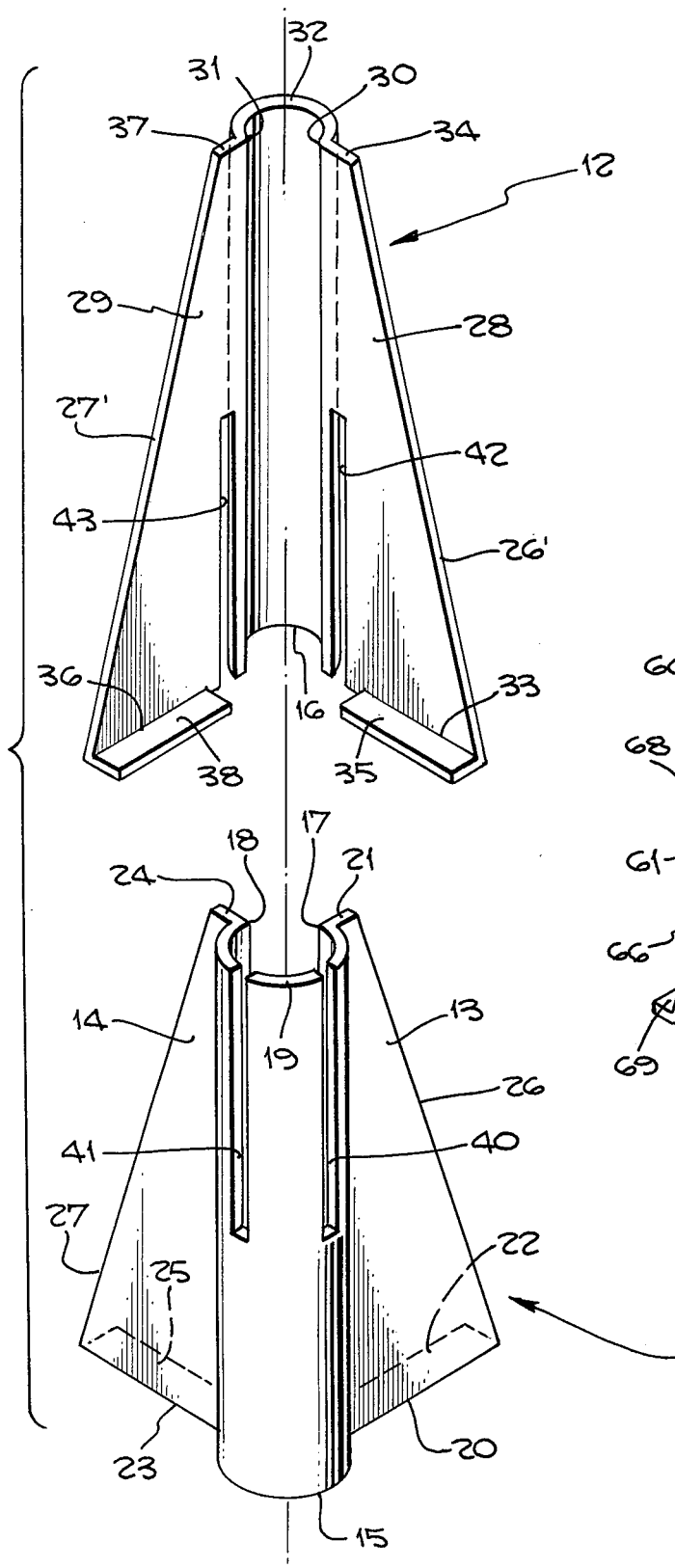
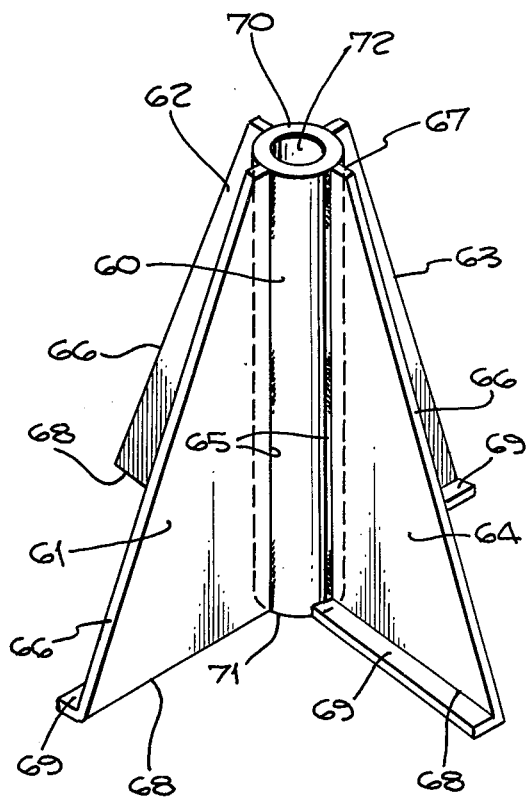

COMPACT INTERLOCKING JACK STAND

This is an improvement on U.S. Pat. No. 4,141,526.

As a matter of established practice, jack stands are used to support loads in the desired position after lifting. Further, in the common use of various types of static or movable heavy load equipment, there is a need to stabilize the load when at rest, to prevent shifting or tipping of the load, as supplementary support.

Commercial jack stands are constructed in different basic configurations. One is a straight column construction with the ground contact area size limited by the diameter of the base column walls, which are thereby limited in their stability to support the load. Another is a pyramid or cone type construction which offers greater ground contact area size in relation to load capacity than straight column stands, in order to provide greater stability in supporting loads.

A common problem in existing jack stand base construction is that they are joined through a variety of commercial practices such as welding, riveting, pinning, etc. As a consequence, these constructions do not provide uniform strength of materials in the base unit under load stress. In normal usage, these joinings are prone to failure, since they present the greatest variable in manufacture and the weakest points in construction.

The invention eliminates such joining and provides uniform strength of material throughout the entire base construction to prevent such failure. Further, the invention specifically prevents dropping of the load due to joining failure which is immediate when a joint breaks. The use of uniform material results in visual distortion of the material if overloaded beyond its rated capacity, forewarning the user of overload and possible collapse.

Jack stands customarily use an extendable central shaft to contact the load. Load stress in straight column base construction, however, is the critical factor which limits bottom ground contact area size and base column diameter because of the strength needed at the juncture of the vertical and horizontal planes. In pyramid or cone type construction, the base central column does not contact the surface on which the stand sits and load stress is distributed instead to the joined or extended support members.

Jack stands made entirely of sheet material unreinforced customarily require material of a relatively heavier gage than when a reinforcing structure can be employed.

Among the objects of the invention is to provide a new and improved jack stand with strength and stability in its top-to-bottom central column base greater than is now provided by other constructions, and by virtue of which there is a broader base area than in straight column stands and more uniform distribution of stress under load than either straight, pyramid or cone type stands.

Another object of the invention is to provide a new and improved jack stand construction reinforced by adjacent positioning of material for greater strength and stability, while reducing the cost of construction through elimination of the need to permanently assemble and join the structure.

Another object of the invention is to provide a new and improved jack stand construction which requires less storage space when not in use than other configurations.

Further among the objects of the invention is to provide a new and improved interlocking stabilizer jack stand for stabilizing the position of roadable vehicles when parked which is simple but rugged in construction and which is both easily assembled when ready to be put to use, and also readily disassembled into a compact form for packing when not in use.

Another object of the invention is to provide a new and improved interlocking jack stand which is of such design that it can be built of relatively light sheet metal, but in such form that there is provided a rugged vertical double columnar effect, capable of supporting a substantial load, and which at the same time is braced against tilting movement.

Still further among the objects of the invention is to provide a new and improved portable jack stand which is readily assembled and disassembled, and which consists of relatively few parts of such configuration and interlocking capability that they can be assembled together in finished workable condition merely by sliding one of the parts endwise with respect to the other, and easily and readily disassembled by merely reversing the operation.

Still further among the objects of the invention is to provide a new and improved interlocking jack stand where the interlocking relationship between adjacent edges of complementary side units not only interlocks the side units in a supporting relationship, but also provides an interlock such that portions of the side units themselves are converted to a reinforced central column acting in a vertical direction and capable of supporting relatively heavy loads, while at the same time being of relatively lightweight construction.

With these and other objects in view, the invention consists of the construction, arrangement, and combination of the various parts of the device serving as an example only of one or more embodiments of the invention, whereby the objects contemplated are attained, as hereinafter disclosed in the specification and drawings, and pointed out in the appended claims.

FIG. 1 is a side perspective view of one form of the device fully equipped for service.

FIG. 2 is a side perspective view of the base portion of the jack stand.

FIG. 3 is a plan view on the line 3—3 of FIG. 2.

FIG. 4 is an exploded view of the base portion of the jack stand.

FIG. 5 is a side perspective view of another form of the jack stand.

In an embodiment of the invention which has been chosen primarily for the purpose of illustration, the interlocking jack stand of the invention indicated generally by the reference character 10 is shown as consisting in the main of two complementary side members 11 and 12. The side member 11 has two legs 13 and 14 of trapezoidal shape with adjacent vertical edges joined at corners 17 and 18 by a semi-cylindrical portion 19, see FIG. 4. The leg 13 has a horizontal bottom edge 20 substantially longer than a horizontal top edge 21. At the bottom edge is an inwardly bent flange 22 to provide a relatively broad support base.

The leg 14 is similarly constructed with a bottom edge 23 and a top edge 24, there being provided a flange 25 for the bottom edge 23.

The leg 13 is provided with an oblique side edge 26 and the leg 14 with a similar oblique edge 27.

The side member 12 is of similar construction having legs 28 and 29 with adjacent edges joining corners 30 and 31. A semi-cylindrical portion 32 spans the distance between the corners 30 and 31. The leg 28 has a bottom edge 33 and top edge 34, the bottom edge being provided with a flange 35. Similarly, the leg 29 has a bottom edge 36, a top edge 37 and a flange 38 for the bottom edge. The leg 28 has an oblique side edge 26' and the leg 29 has an oblique side edge 27'. A bottom edge 15 of the cylindrical portion 19 is in the same plane as the bottom edge 16 of the cylindrical portion 32 and the bottom edges 20, 23, 33 and 36 of the respective legs.

Extending downwardly in the semi-cylindrical portion 19 of the side member 11 are vertical slots 40 and 41. These slots 40 and 41 are open at the tops and closed at the bottoms. Both are spaced equidistant from the corners 18 and 19 by some appreciable amount, a distance determined by location of the legs 28 and 29 with which the slots cooperate.

The side member 12 is also provided with respective slots 42 and 43. In the last instance, the slot 42 extends upwardly from the bottom edge 33 and the slot 43 upwardly from the bottom edge 36. Here again lower ends of the respective slots 42 and 43 are open and upper ends are closed. On this instance the slots 42 and 43 are substantially at the respective corners 30 and 31.

The two side members are adapted to be slid together into the interlock relationship shown in FIGS. 1, 2, and 3 by aligning slots 40 and 41 on one side with slots 42 and 43 on the other side and sliding parts together until sides of the slots 40 and 41 overlie opposite faces of respective legs 28 and 29. At the same time, opposite sides of the slots 42 and 43 will overlie opposite faces of respective legs 13 and 14.

Because of the spacing of the slots relative to the corners in each instance, there is formed at the center of the assembled jack stand a hollow cylindrical or tubular column which provides, in the example of FIGS. 1, 2, and 3, inclusive, a central chamber 50 of circular cross-sectional shape. Substantial portions at the sides of the column are in fact double the thickness of the material of respective legs 13, 14, 28 and 29, as can be readily seen in FIGS. 2 and 3. A substantial additional stiffening and load supporting composite structure is thus built into the device by use of material of all the same uniform thickness or gage.

Adding to the serviceability of the jack stand is a support unit 51 at the top. One example of the unit, namely the unit 51, consists of a vertical shaft 52 threaded throughout its length, at the top of which is a shoe 53. Intermediate opposite ends of the shaft 52 is a collar 54, internally threaded to engage the threaded shaft 52, and provided with wings 55 and 56 for ease in handling. A substantial portion of the length of the shaft 52 is confined within the chamber 50 where, by reason of providing a snug sliding fit, there is lateral support for the shaft. The collar 54 can be adjusted up or down on the shaft 52 in order to change the elevation of the shoe 53 so that it will engage the underside of the vehicle (not shown) with which it is to be used.

It is further advantageous to have the top edges 21, 24, 34 and 37 of the legs in the same plane as the top edge of the tubular column formed by the semi-cylindrical portions 19 and 32 thereby providing a broad base of support for the collar 54 of the support unit 51. The bottom of the tubular column also should preferably be in the same horizontal plane as the bottom edges 20, 23, 33 and 36.

In the form of invention of FIG. 5 there is a central tubular column 60 which may, if desired, have a thickness greater than the thickness of material forming legs 61, 62, 63 and 64. The legs are identical, each having a vertical inside edge 65, an oblique outside edge 66 and respective horizontal upper and lower horizontal edges 67 and 68. At the lower edge 68 in each instance is a flange 69.

At the top of the tubular column 60 a flat top edge 70 is on the same plane as the top edges 67 of the legs. The legs are secured at circumferentially equally spaced intervals to the exterior of the tubular column 60 as by welding or other appropriate means. The bottom surfaces of the flanges 69 are preferably on the same horizontal plane as the bottom edge 71 of the tubular column 60. The tubular column 60 provides a cylindrical hollow interior wall 72 for accommodation of the vertical shaft 52 in a manner such that the collar 54 rests on the top edges 67 of the legs and the flat top edge 70 of the tubular column 60.

Irrespective of the manner in which the legs of the jack stand cooperate with each other in an appropriate interlocking relationship, a support unit such as the unit 51 may be employed.

Having described my invention, what is claimed as new in support of Letters Patent is as follows:

1. An interlocking jack stand comprising side members each providing a central hollow column section, each side member comprising leg means of sheet metal of substantially uniform thickness and having a width tapering from a relatively narrow top to a relatively wide base, said side members being in interlocked engagement at inside vertical edges of legs of said members and said column sections, horizontal edges at the bases of said legs being at an angle with respect to each other and forming a supporting base, horizontal edges at the tops of said legs being at a corresponding angle with respect to each other and forming a supporting platform, there being two legs for each side member comprising flat plates in right angular relationship and forming a vertically extending junction therebetween, means forming slots in the one side member extending inwardly from one end of the column and means forming slots in the other side member extending inwardly from the opposite end of the column, the slots being separated enabling formation of a vertical chamber when the side members are interlocked, each said vertically extending junction having an arcuate form and said vertical chamber having a substantially circular cross-sectional shape.

2. An interlocking jack stand as in claim 1 wherein portions of one side member which form part of the column section have a position in overlying engagement with portions of the other side member which form part of the column section whereby corresponding portions of the column section have a double wall structure.

3. An interlocking jack stand as in claim 1 wherein the slots in one of said side members are at the corners formed between the legs and the column section, and the slots in the other of said side members are formed in the column section intermediate opposite edges.

4. An interlocking jack stand comprising a central hollow column, two side members comprising leg means of sheet metal of substantially uniform thickness and having a width tapering from a relatively narrow top to a relatively wide base, inside vertical edges of said leg means having an interlocked engagement with said hollow column at the perimeter of said hollow column, horizontal edges at the tops of said leg means being at a corresponding angle with respect to each other, said horizontal edges being in the same horizontal plane as the top of the column and forming a supporting platform, a vertically adjustable support unit having a shaft located in said hollow column, and means on the shaft in supported engagement with said supporting platform, said shaft having the same cross-sectional shape as the cross-sectional shape of said hollow column.

5. An interlocking jack stand as in claim 1 wherein there is a vertically adjustable support unit having a shaft located within said hollow column sections, and means on the shaft in supported engagement with said supporting platform, said shaft having the same cross-sectional shape as the cross-sectional shape of said hollow column sections.

* * * * *